(12) United States Patent
Kwon et al.

(10) Patent No.: US 6,995,804 B2
(45) Date of Patent: Feb. 7, 2006

(54) METHOD AND APPARATUS FOR SEPARATING COLOR AND LUMINANCE SIGNALS

(75) Inventors: Sun Kyu Kwon, Kyungsangbuk-Do (KR); Yeong-Ho Ha, Daegu (KR)

(73) Assignee: LG Electronics Inc., Seoul (KR)

( * ) Notice: Subject to any disclaimer, the term of this patent is extended or adjusted under 35 U.S.C. 154(b) by 766 days.

(21) Appl. No.: 10/140,080

(22) Filed: May 8, 2002

(65) Prior Publication Data

US 2002/0167591 A1    Nov. 14, 2002

(30) Foreign Application Priority Data

May 9, 2001    (KR) ............................... 2001-25200

(51) Int. Cl.
*H04N 9/78*    (2006.01)
(52) U.S. Cl. .................. 348/663; 348/665; 348/667; 348/668; 348/669
(58) Field of Classification Search ............... 348/665, 348/669, 670, 667, 663, 668
See application file for complete search history.

(56) References Cited

U.S. PATENT DOCUMENTS

| | | | | |
|---|---|---|---|---|
| 5,140,410 A | * | 8/1992 | Shin | 348/669 |
| 5,285,266 A | * | 2/1994 | Jo | 348/665 |
| 5,589,888 A | * | 12/1996 | Iwasaki | 348/669 |
| 5,929,938 A | * | 7/1999 | Cho | 348/665 |
| 5,990,978 A | * | 11/1999 | Kim et al. | 348/663 |
| 6,400,762 B2 | * | 6/2002 | Takeshima | 375/240.01 |
| 6,674,488 B1 | * | 1/2004 | Satoh | 348/663 |

* cited by examiner

*Primary Examiner*—John Miller
*Assistant Examiner*—Trang U. Tran
(74) *Attorney, Agent, or Firm*—Birch, Stewart, Kolasch & Birch, LLP

(57) ABSTRACT

An apparatus for separating color and luminance signals from a composite video signal in consideration of the existence and degree of a motion of the video image. The apparatus includes an output section, a first filter, a second filter, a third filter, a motion detector, a motion estimator, a color selector and a luminance selector. The color and luminance selectors select and output the color and the luminance signal from the output signals of the filters in accordance with the existence and degree of the motion.

16 Claims, 5 Drawing Sheets

CURRENT(t)FRAME    PREVIOUS(t-1)FRAME

CURRENT(t)FRAME    PREVIOUS(t-1)FRAME

CURRENT(t)FRAME    PREVIOUS(t-1)FRAME

METHOD AND APPARATUS FOR SEPARATING COLOR AND LUMINANCE SIGNALS

BACKGROUND OF THE INVENTION

1. Field of the Invention

This invention relates to a method and apparatus for separating color and luminance signals from a composite video signal, and more specifically to a method and apparatus for separating color and luminance signals in consideration of the existence and degree of a motion.

2. Background of the Related Art

Typically, the video signal modulation method of a color television is classified into an NTSC (National Television System Committee), PAL (Phase Alternation by Line), SECAN (Sequential Couleur a Memoire) in accordance with the is method of modulating the color and the luminance signal.

In the NTSC standard, a subcarrier is modulated and a color signal C comprising I and Q components is frequency-interleaved into a luminance signal Y so as to use effectively frequency bandwidths.

Then, the encoded composite video signal is received through a color television receiver, separated into the color and the luminance signal, and then displayed on a monitor. At this time, the bandwidth of the color signal is 3.58 MHz and that of the luminance signal is 4 MHz.

However, if the composite video signal is incompletely separated into the color and the luminance signal, the picture quality is distorted or undesirable patterns are displayed due to cross luminance or cross color.

Therefore, color/luminance separation circuits have been provided to solve the problem.

As shown in FIG. 1, a conventional color/luminance separation circuit comprises a composite video signal output section 1 for receiving and outputting a composite video signal, and a composite signal separator 2 for separating the inputted composite video signal into the color and the luminance signal.

The composite signal separator 2 uses a line comb filter to filter spatially the composite video signal, separate into the color and luminance signal, and output the separated signals.

Hereinafter, the configuration and operation of the composite signal separator will be described in detail with reference to FIG. 2.

The composite signal separator 2 comprises a delay section 3, a first subtractor 4, an amplifier 5, a band pass filter 6, and a second subtractor 7.

First, the composite video signal being inputted through an antenna is transmitted to the delay section 3 to delay for the duration of 1 horizontal scan line 1H.

Then, the first subtractor 4 subtracts the outputted signal from the delay section 3 from the current composite video signal and outputs the resulting signal. The resulting signal represents the color signal C which is subtracted from the component of the luminance signal Y from the composite video signal.

Then, the resulting color signal is amplified in the amplifier 5, and the amplified color signal is filtered to 3.59 MHz in the band pass filter 6. As a result, the color signal C is filtered from the composite video signal. Meanwhile, the second subtractor 7 subtracts the color signal C with 3.58 MHz bandwidth from the current composite video signal. As a result, a luminance signal Y is filtered from the composite video.

Thus, the composite signal separator 2 performs the phase inversion of the two horizontal scan lines in the composite video signal to provide the separated color signal and the separated luminance signal.

However, the above-described conventional color/luminance signal separation circuit has problems and produces a hanging dot or a sitting dot when a motion exists on the video image. Because of adding the color signal to the luminance signal, the hanging dot is produced when the color and the luminance signal are separated from the composite video signal.

To solve the above-described problems, another color/luminance signal separation circuit with respect to the image motion has been developed.

As shown in FIG. 3, the separation circuit includes a composite signal output section 10, first and second filters 20, 30, an image motion detector 40 for outputting a control signal when the image motion is detected, a color signal selector 50 for selecting one of the first and second color signals according to the control signal, and a luminance signal selector 60 for selecting one of the first and second luminance signals according to the control signal.

The first filter 20 uses the frame comb filter which filters temporally the composite video signal, and the second filter 30 uses the line comb filter which filters spatially the composite video signal, Therefore, the above-described color/luminance signal separation circuit outputs the first color and luminance signals C1, Y1, being separated by the first filter 20, and the second color and luminance signals C2, Y2, being separated by the second filter 30.

The first filter 20 performs the processing of phase inversion of the color signals in the frames to separate the first color signal C1 and the first luminance signal Y1. However, the second filter 30 performs the processing of phase inversion of the color signals in the horizontal scan lines to separate the second color signal C2 and the second luminance signal Y2.

The motion detector 40 receiving the composite video signal from the output section 10 detects existence of the motion in the composite video signal using the temporal frame difference of the composite video signal. The temporal frame difference is obtained from the difference between the current and previous frames.

If the temporal frame difference is zero, the motion detector 40 outputs the control signal with "0" level to the color and the luminance signal selector 50, 60, respectively. And if not, the motion detector 40 outputs the control signal with "1" level to the selectors 50, 60, respectively.

Then, if the control signal from the motion detector 40 is zero, the selectors 50, 60 output the first color signal C1 and the first luminance signal Y1 in accordance with the control signal, respectively. And if not, the selectors 50, 60 output the second color signal C2 and the second luminance signal Y2, respectively.

Accordingly, the conventional separation circuit detects the existence of the motion from the composite video signal, and then selects and outputs the color and the luminance signals in accordance with the existence of the image motion.

However, the above-described conventional separation circuit has the following problems.

First, as the circuit does not detect the degree of the motion, it can not separate completely the color and the luminance signals from the composite video signal.

Second, although the conventional separation circuit separates the color and the luminance signals after determining the existence of the motion, it an not be protected from cross color or the cross luminance effects, as it uses the conventional line comb filter.

SUMMARY OF THE INVENTION

Accordingly, it is an object of this invention to provide an apparatus which can separate completely a composite video signal to obtain an image of high quality.

It is another object of this invention to provide a method which can separate a composite video signal to obtain an image of high quality.

In one aspect of the present invention, there is provided a composite signal separation apparatus comprising an output section, first, second and third filters, a motion detector, a motion estimator, a controller, a color signal selector and a luminance signal selector.

The output section outputs the composite video signal combining the color and the luminance signal. The first filter is a frame comb filter for separating a first color signal and a first luminance signal from the composite video signal, and the second filter is line comb filter for separating a second color signal and a second luminance signal from the composite video signal. The motion detector detects the existence of a motion in the composite video signal using the second luminance signal and outputs a motion signal if the existence of the motion is detected. The motion estimator estimates the degree of the motion in the composite video signal using the second luminance signal according to the motion signal from the motion detector. The third filter separates a third color signal and a third luminance signal from the composite video signal according to the degree of the motion from the motion estimator. The controller outputs a control signal for selecting one of the first, second and third color signals and one of the first, second and third luminance signals according to the motion signal and the degree of the motion. The color signal selector selects one of the first, second and third color signals according to the control signal from the controller, and the luminance signal selector selects one of the first, second and third luminance signals according to the control signal.

In another aspect of this invention, there is provided a method of separating a composite signal comprising the steps of (1) separating a first color signal and a first luminance signal from the composite video signal by frame-comb-filtering the composite video signal, (2) separating a second color signal and a second luminance signal from the composite video signal by line-comb- filtering the composite video signal, (3) detecting the degree of a motion in the composite video signal using the second luminance signal and determining whether or not the detected degree of the motion is higher than a first predetermined value, (4) measuring difference values between the second luminance signal of a reference block of current frame and those of the corresponding comparative blocks of the previous frame in a search region, respectively, if the detected degree of the motion is higher than the first predetermined value, (5) detecting a minimum value of the difference values and determining whether or not the detected minimum value is lower than a second predetermined value, (6) outputting the second color signal and the second luminance signal if the minimum value is higher than the second predetermined value, (7) measuring a dispersion value of the difference values of the second luminance signals and discriminating whether or not the measured dispersion value is higher than a third predetermined value, and (8) outputting the third color signal and the third luminance signal separated from the composite video signal if the measured dispersion value is higher than the third predetermined value.

The above, and other objects, features and advantages of the invention will be apparent in the following detailed description of the preferred embodiments. However, it is not intended to limit the invention solely to the embodiments described herein.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE PREFERRED EMBODIMENTS

Figure 1:
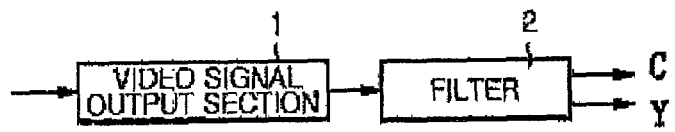
FIGS. 1 and 2 are block diagrams showing a conventional apparatus for separating a composite video signal into a color signal and a luminance signal.
Figure 2:
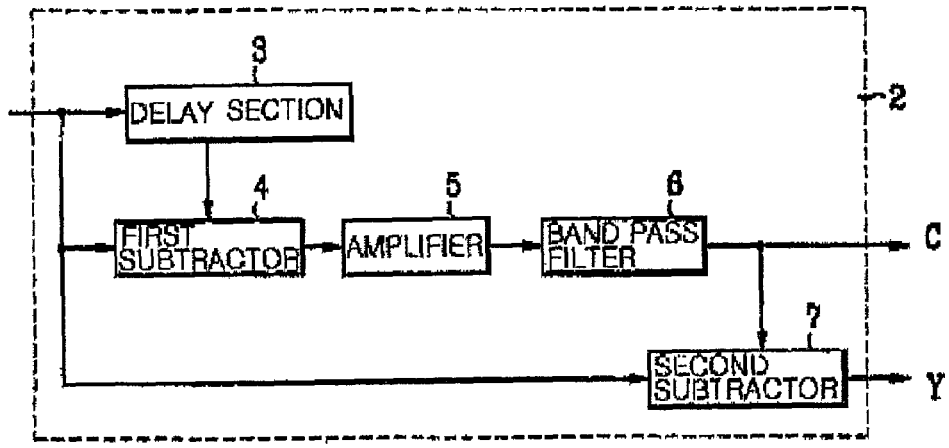
Figure 3:
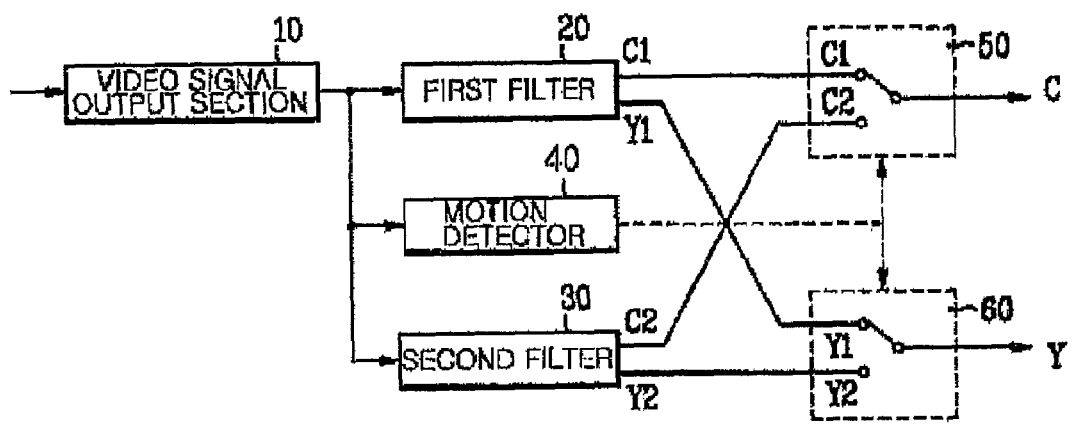
FIG. 3 is a block diagram showing another conventional apparatus for separating a composite video signal into a color signal and a luminance signal.
Figure 4:
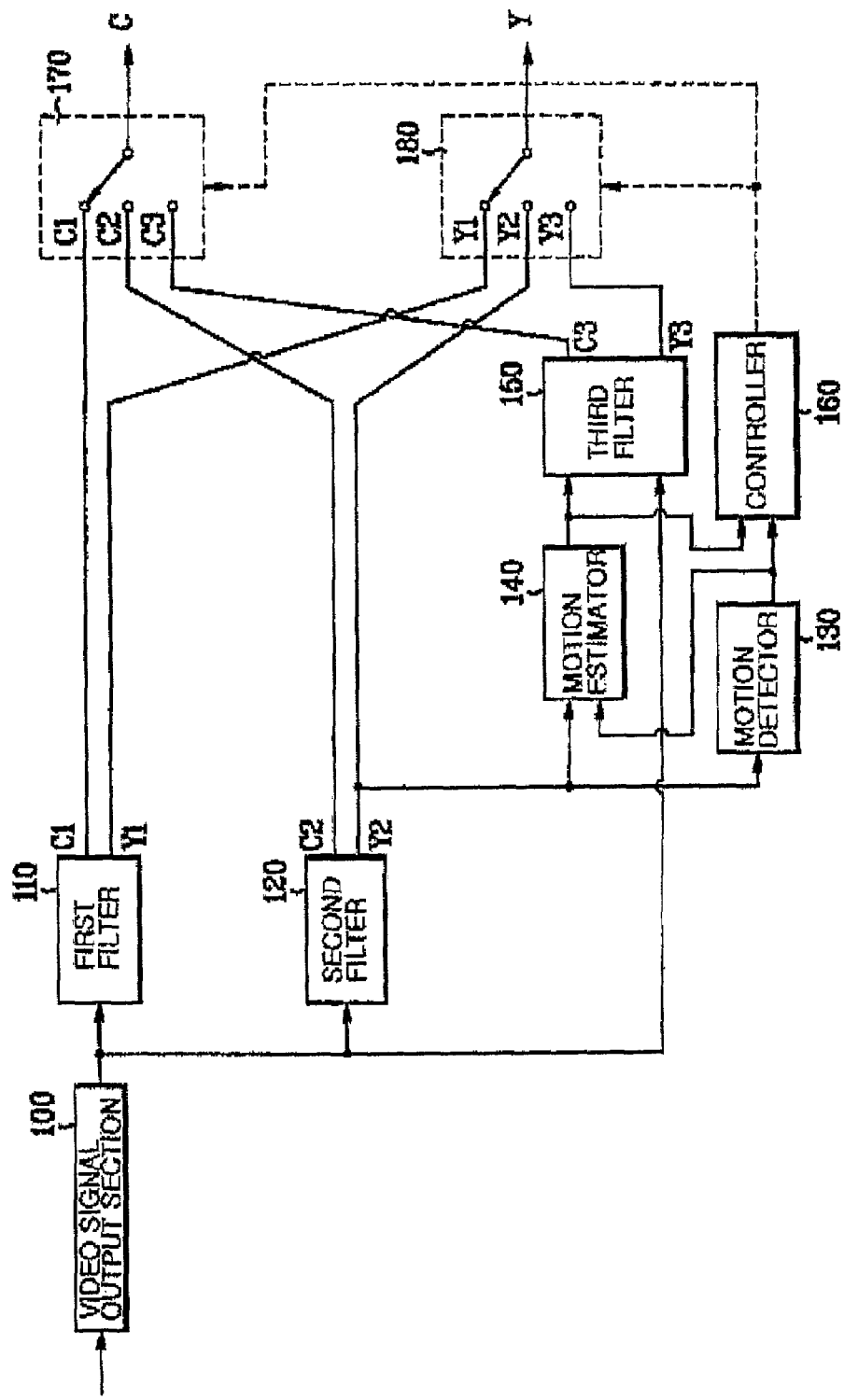
FIG. 4 is a block diagram showing an apparatus for separating a composite video signal into a color signal and a luminance signal according to the present invention.

FIG. 4 is a block diagram showing an apparatus for separating a color signal and a luminance signal from a composite video signal according to the present invention. The configuration of the apparatus in accordance with the present invention is described as follows with reference to FIG. 4.

Referring to the FIG. 4, the apparatus of the present to invention includes an output section 100, a first filter 110, a second filter 120, a third filter 150, a motion detector 130, a motion estimator 140, a controller 160, a color selector 170 and a luminance selector 180.

The output section 110 outputs a composite video signal to the first, second and third filters 110, 120 and 150, respectively.

The first filter 110 is a frame comb filter filtering temporally the composite video signal, the second filter 120 is a line comb filter filtering spatially the composite video signal, and the third filter 150 is a motion compensation type frame comb filter filtering temporally the composite video signal according to the degree of the motion.

The first, second and third color signals C1, C2, C3 outputted from the first, second and third filter 110, 120, 150, respectively, are inputted to the color selector 170. Also, the first, second and third luminance signals Y1, Y2, Y3 are inputted to the luminance selector 180.

And, the second luminance signal Y2 is inputted to the motion detector 130 which detects the existence of the motion in the picture. The motion estimator 140 estimates the degree of the motion using the second luminance signal Y2.

The controller 160 is connected to the color selector 110 in order to select one of the first, second and third color signals C1, C2, C3 in accordance with the motion detector 130 and the motion estimator 140. Also, the controller 160 is connected to the luminance selector 180 in order to select one of the first, second and third luminance signals Y1, Y2, Y3 in accordance with the motion detector 130 and the motion estimator 140.

Hereinafter, the operation of the apparatus according to the present invention will be described.

First, the output section 100 receives the composite video signal and outputs the signal to the first, second sand third filters 110, 120, 150.

Then, the first filter 110 separates the first color signal C1 and the first luminance signal Y1 from the composite video signal using the phase inversion of the color signal between the frames.

Meanwhile, the second filter 120 separates the second color signal C2 and the second luminance signal Y2 using the phase inversion of the color signal between the horizontal scan lines. The second luminance signal separated in the second filter is inputted to the motion detector 130 and the motion estimator 140.

The motion detector 130 inputs the second luminance signal Y2 and detects the existence of the motion in the composite video signal using the difference between the second luminance signal of the current frame and that of the previous frame.

Then, if the motion is detected in the motion detector, the motion estimator 140 determines the temporal similarity between the current and the previous frames using the second luminance signal Y2, and estimates the degree of the motion in the picture.

The third filter 150 separates the composite video signal into the third color signal C3 and the third luminance signal Y3 according to the degree of the motion from the motion estimator 140. Then, the output signals of the motion detector 130 and the motion estimator 140 are inputted to the controller 160.

Meanwhile, the first, second and third color signals C1, C2, C3 are inputted to the color selector 170, and the first, second and third luminance signals Y1, Y2, Y3 are inputted to the luminance selector 10.

The controller 160 provides the color and luminance selectors 170, 180 with the control signals, respectively, in order to select one of the first, second and third color signals and one of the first, second and third luminance signals in accordance with the existence and the degree of the motion.

Figure 5:
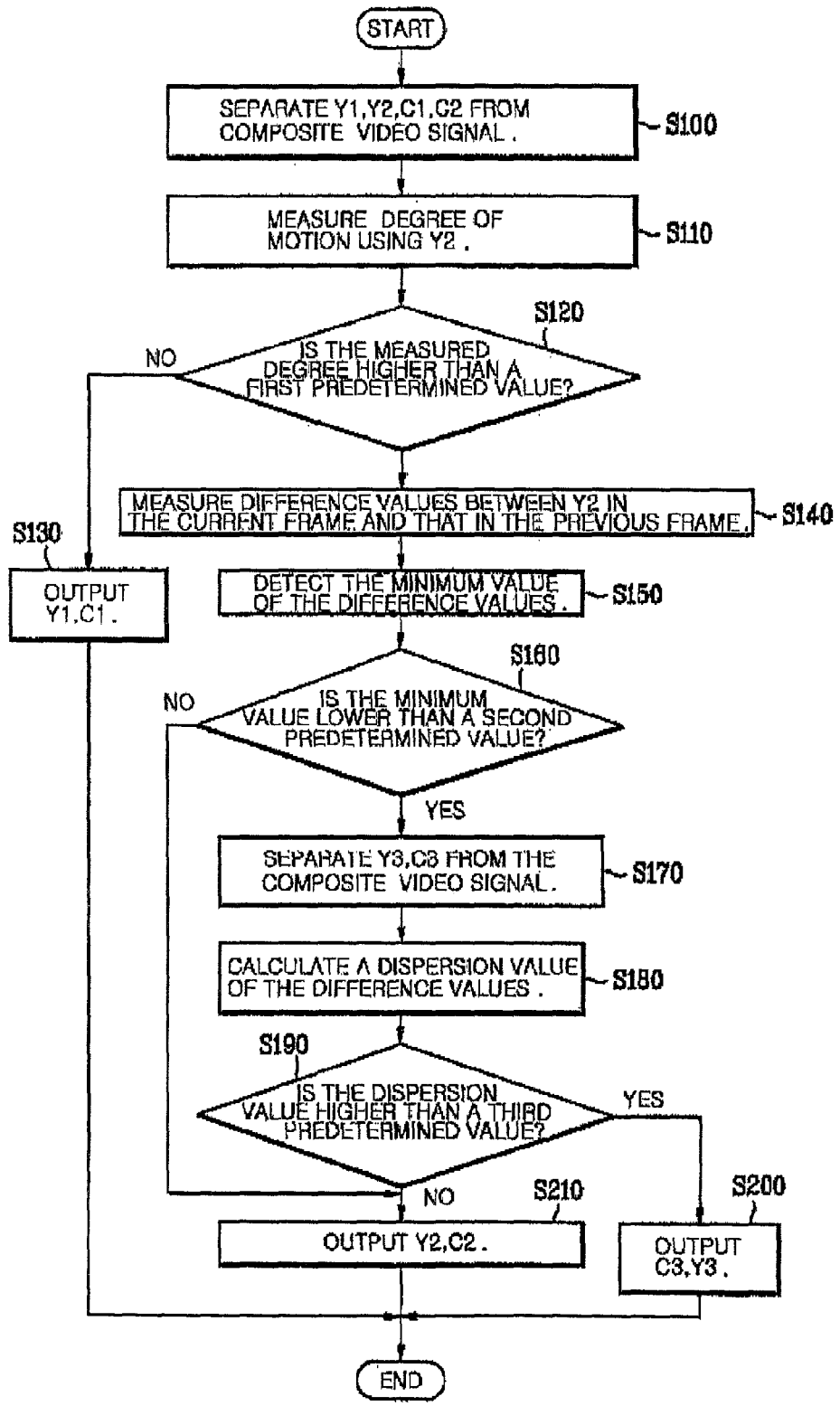
FIG. 5 is a flowchart illustrating the method of separating the composite video signal into a color signal and a luminance signal according to the present invention.

FIG. 5 is a flowchart illustrating the method of separating the composite video signal according to the present invention.

Referring to FIG. 5, the method of separating the composite video signal according to the present invention will now be described in detail.

First, the first filter 110 separates the first color signal C1 and the first luminance signal Y1 from the composite video signal, and then outputs the separated signals to the color selector 170 and the luminance selector 100, respectively. Also, the second filter 120 separates the second color signal C2 and the second luminance signal Y2 from the composite video signal, and then outputs the separated signals to the color selector 170 and the luminance selector 180, respectively (step 100).

Then, the motion detector 130 measures the motion value using the second luminance signal Y2 from the second filter 120 (step 110).

Figure 6:
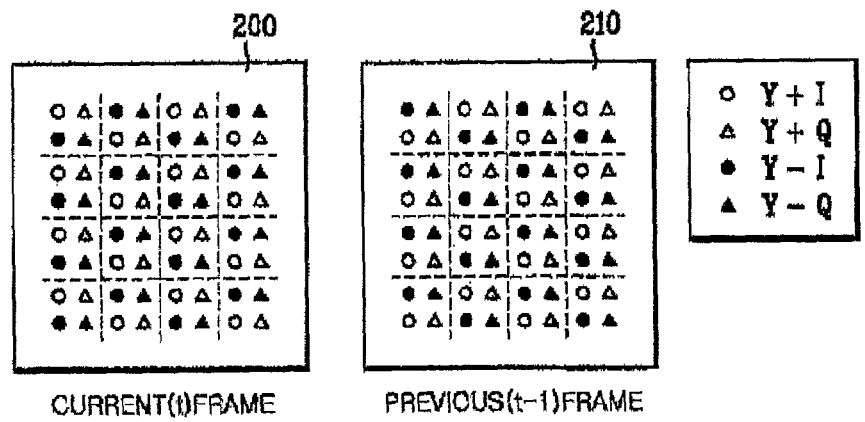
FIG. 6 shows a signal pattern of the video signal in accordance with the present invention.

As shown in FIG. 6, the motion detector 130 compares the reference block of the current (t) frame 200 with the comparative block of the previous (t-1) frame 210 in the same position of the reference block, and then measures the difference value between the second luminance signals of the blocks.

In calculating the difference value between the second luminance signals of the blocks, it is preferred that the block is get a section of 2*2 pixels. If the section of the block is set to a 1*1 pixel, the detection and the estimation of the motion can not perform correctly due to a reaction on the external noise. Also, if the section of the block is set to 4*4 pixels, it produces the effect of a cross color and a cross luminance due to a blocking artifact.

Then, it discriminates if the difference value of the second luminance signals is higher than a reference value(step 120). The reference value is preferably set to a value 15times the number of the pixels in one block. Accordingly, when the block comprises 2*2 pixels, the reference value is set to 60.

If the difference value is higher than the reference value, the motion detector 130 outputs "1". And if not, the motion detector 130 outputs "0".

If the difference value is lower than the reference value, the controller 160 outputs control signals to the color selector 170 and the luminance selector 180 in order to select the first color signal C1 and the first luminance signal Y1 from the first filter 110.

Accordingly, if the motion value is lower than the reference value, the color selector 170 and the luminance selector 180 output the first color signal C1 and the first luminance signal Y1, respectively (step 130).

Figure 7:
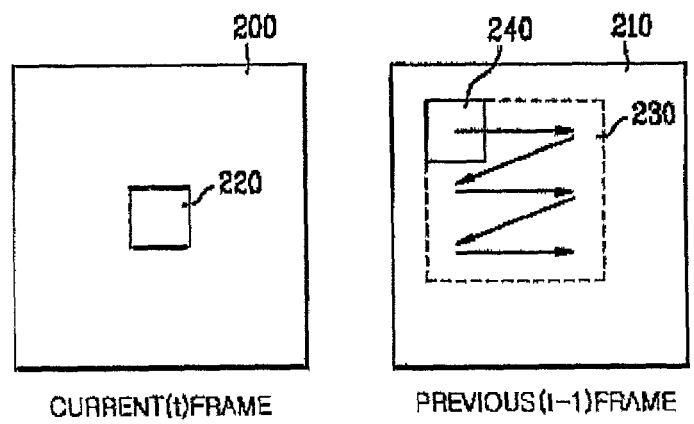
FIG. 7 is a view describing the operation of the motion estimator in accordance with the present invention.

Meanwhile, if the difference value is higher than the reference value, as shown in FIG. 7, the reference block in the current frame and the comparative block in a predetermined search region of the previous frame are compared each other. Then, the difference values between the second luminance signals of the reference block and those of the all of the comparative blocks in the search region (step 140) are calculated.

Then, the minimum, value of the difference values (step 150) is detected, and it is determined whether or not the minimum value is lower than a threshold value (step 160). The threshold value is preferably determined by 2.5 times the number of the blocks in a search region.

Accordingly, the motion estimator 140 detects a temporal similarity between the current and the previous frames using the second luminance signals Y2.

In order to separate the composite video signal, the method of the present invention estimates the existence of the motion and a motion vector using the second luminance signal to Y2, to which human's eyes are sensitive and has a wider range of representation than that of the composite video signal.

If the minimum value is lower than the threshold value, the motion estimator 140 outputs "1", and if not, the motion estimator 140 outputs "0".

If the minimum value is higher than the threshold value, it means that the comparative block is very different from the reference block. Therefore, the second filter 120 separates the color and the luminance signals from the composite video signal end, outputs the separated signals to the color selector 170 and the luminance selector 180, respectively (step 170).

Then, to measure a distribution of the difference values between the second luminance signals in the reference block of current frame and those in the comparative block of the previous frame, a dispersion value of the difference values between the second luminance signals in the reference block of the current frame and those in the comparative block of the previous frame (step 180) is calculated. The dispersion value is represented by the following equation $$\frac{\sum_{i=1}^{N}(X_i - \overline{X})^2}{N}$$

where, N, $X_i$, $\overline{X}$ represent the number of the comparative blocks in the search region of the previous frame, the difference value between the luminance signals of the reference block of the current frame and the i-th comparative block of the previous frame, and the mean value of the difference values of the second luminance signals, respectively.

In another embodiment of the present invention, to measure the distribution of the difference values between, the second luminance signals a mean value and a minimum value of the difference values between the second luminance signals of the reference block in the current frame and those of the comparative block in the previous frame is calculated. The dispersion value is determined as the difference value between the mean value and the minimum value.

Then, the motion estimator 140 discriminates whether or not the dispersion value is higher than a predetermined value (step 190). If the dispersion value is higher than the predetermined value, the motion estimator 140 outputs "1", and if not, the motion estimator 140 outputs "0".

It is preferable to sot the predetermined value to five times the minimum value.

If the output signal of the motion estimator is "1", the controller 160 outputs control signals to the color selector 170 and the luminance selector 180 to select the third color signal C3 and the third luminance signal Y3 from the third filter 150.

That is, if the dispersion value is higher than the predetermined value, the color selector 170 and the luminance selector 180 output the third color signal C3 and the third luminance signal Y3, respectively (step 200).

If the mean value from the estimator 140 is higher than the predetermined value or the dispersion value is lower than the predetermined value, the color selector 170 and the luminance selector 180 output the second color signal C2 and the second luminance signal Y2, respectively (step 210).

The method of selecting the third color and the luminance signals C3, Y3 in the third filter 150 is now described.

Figure 8:
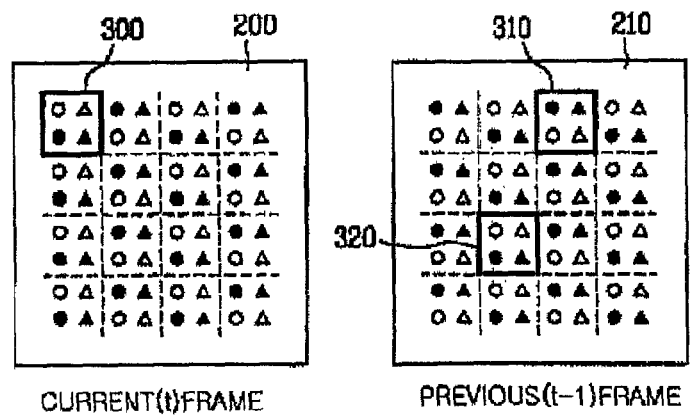
FIGS. 8, 9A and 9B are views for describing the operation of the filters in accordance with the present invention.
Figure 9A:
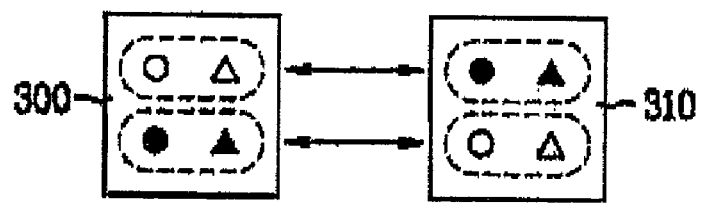
Figure 9B:
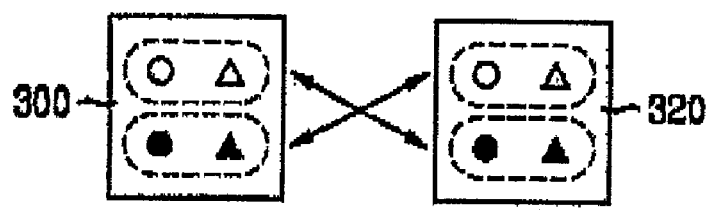

As shown in FIG. 8, if the comparative block of the previous frame 210 moves from the reference block of the current block 200 to the extent of an even number of the block, the operation is performed in the same horizontal scan lines as shown in FIG. 9A to separate the composite video signal, into the third color signal C3 and the third luminance signal Y3. If the comparative block moves from the reference block to the extent of an odd number of the block, the operation is performed in the different horizontal scan lines as shown in FIG. 9B to separate the composite video signal into the third, color signal C3 and the luminance signal Y3.

At this time, the separation of the color signal is performed through the operation of the subtraction, and the separation of the luminance signal is performed through the operation of the addition. As a result, the composite video signal is separated into the third color and the luminance signals.

In the method according to the present invention, the motion detector 130 and the motion estimator 140 respectively detect the existence of the motion and the motion region, in order to separate the color and the luminance signals from the composite video signal according to the characteristics of the image using the line comb filter, the frame comb filter and the motion compensation frame comb filter.

Figure 10:
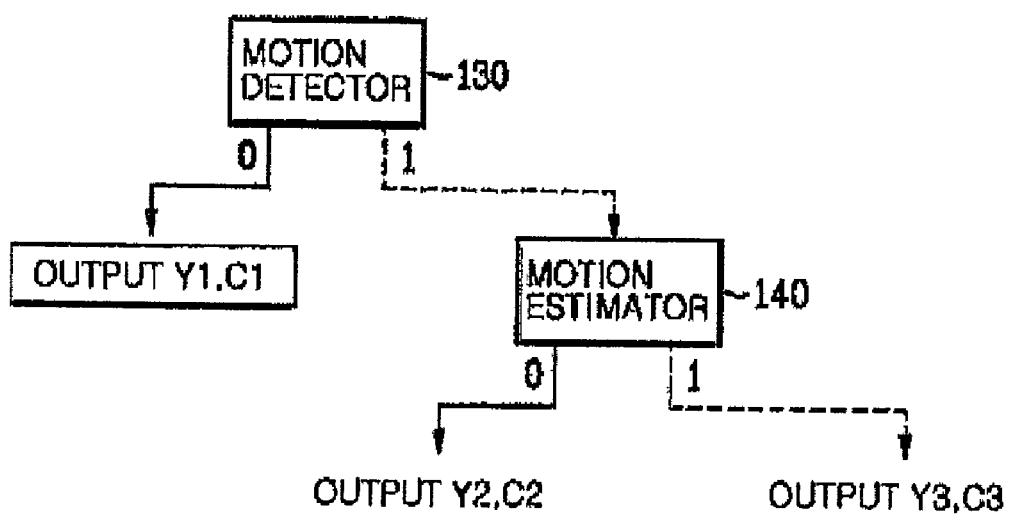
FIG. 10 is a flowchart illustrating an operation of the filters and, the signal estimator in accordance with the present invention.

As shown in FIG. 10, if the output signal from motion detector 130 is "0" level, the first-color and luminance signals are outputted.

Meanwhile, if the output signal from the motion detector 130 is "1" level and the output signal from the notion estimator 140 is "0" level, the second color and luminance signals are outputted.

Meanwhile, if the output signal from the motion detector 130 is "1" level and the output signal from the motion estimator 140 is "1" level, the third color and luminance signals are outputted.

It should be understood that the present invention is not limited to the particular embodiment disclosed herein as the best mode contemplated for carrying out the present invention. It is intended to cover various modifications and similar arrangements included within the spirit and scope of the claims. Also, it is intended that the scope of the present invention be defined by the following claims and their equivalents,

What is claimed is:

1. An apparatus for separating color and luminance signals from a composite video signal, the apparatus comprising:
   an output section for outputting the composite video signal combining the color signal and the luminance signal;
   a first filter for frame-comb-filtering the composite video signal to separate a first color signal and a first luminance signal from the composite video signal;
   a second filter for line-comb-filtering the composite video signal to separate a second color signal and a second luminance signal from the composite video signal;
   a motion detector for detecting the existence of a motion in the composite video signal using the second luminance signal, and outputting a motion signal if the existence of the motion detected;
   a motion estimator for estimating the degree of the motion in the composite video signal using the second luminance signal according to the motion signal from the motion detector;
   a third filter for separating a third color signal and a third luminance signal from the composite video signal according to the degree of the motion from the motion estimator;
   a controller for outputting a control signal for selecting one of the first, second and third color signals and one of the first, second and third luminance signals, respectively, according to the motion signal and the degree of the motion;
   a color signal selector for selecting one of the first, second and third color signals according to the control signal; and
   a luminance signal selector for selecting one of the first, second and third luminance signals according to the control signal.

2. The apparatus according to claim 1, wherein the first filter is a frame comb filter which filters temporally the composite video signal and outputs the first color and luminance signals.

3. The apparatus according to claim 1, wherein the second filter is a line comb filter which filters spatially the composite video signal and outputs the second color and luminance signals.

4. The apparatus according to claim 1, wherein the third filter is a motion compensation type frame comb filter which filters spatially in accordance with the degree of the motion, and outputs the third color and luminance signals.

5. A method of separating color and luminance signals from a composite video signal, the method comprising the steps of:
separating a first color signal and a first luminance signal from the composite video signal by frame- comb-filtering the composite video signal;
separating a second color signal and a second luminance signal from the composite video signal by line-comb-filtering the composite video signal;
detecting the degree of a motion in the composite video signal using the second luminance signal, and determining whether or not the detected degree of the motion is higher than a first predetermined, value;
measuring difference values between the second luminance signals of a reference block in the current frame and the corresponding comparative blocks in a search region of the previous frame if the detected degree of the motion is higher than the first predetermined value;
detecting a minimum value of the difference values and determining whether or not the detected minimum value is lower than a second predetermined value;
outputting the second color signal and the second luminance signal if the minimum value is higher than the second predetermined value;
measuring a dispersion value of the difference values of the second luminance signals, and discriminating whether or not the measured dispersion value is higher than a third predetermined value; and
outputting the third color signal and the third luminance signal separated from the composite video signal if the measured dispersion) value is higher than the third predetermined value.

6. The method according to claim 5, further comprising the step of outputting the first color signal and the first luminance signal if the degree of the motion is lower than the first predetermined value.

7. The method according to claim 5, further comprising the step of outputting the second color signal and the second luminance signal if the dispersion value is lower than the third predetermined value.

8. The method according to claim 5, wherein the step of detecting the minimum value includes the steps of comparing the second luminance signal of a reference block of current frame with those of the corresponding comparative blocks of previous frame in a search region, calculating the difference values of the compared second luminance signals, and discriminating the minimum value of the calculated difference values.

9. The method according to claim 5, wherein the step of separating the third color and luminance signals performs in accordance with the degree of moving the comparative block which is in the previous frame and has the minimum value of the second luminance difference value.

10. The method according to claim 5, wherein the reference block or the comparative block is comprised of 2*2 pixels.

11. An apparatus for separating a color signal and a luminance signal from a composite video signal, the apparatus comprising:
an output section for outputting the composite video signal combining the color signal and the luminance signal;
a first filter for frame-comb-filtering the composite video signal and separating the first color signal and the first luminance signal from the composite video signal;
a second filter for line-comb-filtering the composite video signal and separating the second color signal and the second luminance signal from the composite video signal;
a motion detector for detecting the existence of a motion in the composite video signal using the second luminance signal, and outputting a motion signal if the existence of the motion is detected;
a motion estimator for estimating a degree of the motion in the composite video signal using the second luminance signal and outputting a motion vector if the motion signal is detected;
a third filter for separating the third color signal and the third luminance signal from the composite video signal using the motion vector;
a color signal selector for selecting one of the first, second and third color signals in accordance with the motion signal and the motion vector; and
a luminance signal selector for selecting one of the first, second and third luminance signals in accordance with the motion signal and the motion vector.

12. The apparatus according to claim 11, wherein the motion detector measures the difference value between the second luminance signal of the reference block in the current frame and that of the comparative block in the previous frame, discriminates whether or not the measured difference value is higher than a first predetermined value, and outputs a motion signal if the measured difference value is higher than the first predetermined value, wherein the color signal selector outputs the first color signal and the luminance signal selector outputs the first luminance signal if the motion signal is not outputted from the motion detectors.

13. The apparatus according to claim 11, wherein if the motion signal is outputted from the motion detector, the motion estimator compares the second luminance signal of the reference block in the current frame with those of the comparative blocks in the search region of the previous frame, measures the difference values of the compared second luminance signals, and discriminates the minimum value of the measured difference values, wherein the color signal selector outputs the second color signal and the luminance signal selector outputs the second luminance signal if the minimum value is higher than a first predetermined value.

14. The apparatus according to claim 13, wherein the motion estimator obtains a dispersion value of the measured difference values if the minimum value is lower than the first predetermined value, wherein the color selector outputs the second color signal and the luminance selector outputs the second luminance signal if the dispersion value is lower than a second predetermined value, while if not, it outputs the third color signal and the third luminance signal, respectively.

15. The apparatus according to claim 14, wherein the dispersion value is a difference value between the mean value of the second luminance difference values and the minimum value thereof.

16. The apparatus according to claim 11, wherein the third filter is the motion compensation type comb filter which filters spatially in accordance with the estimated degree of the motion and outputs the third color signal and the third luminance signal.

* * * * *